United States Patent [19]

Prickett et al.

[11] 4,144,534
[45] Mar. 13, 1979

[54] BATTLEFIELD IFF SYSTEM

[75] Inventors: Michael J. Prickett, San Diego; Bernarr H. Humpherys, Escondido, both of Calif.

[73] Assignee: The United States of America as represented by the Secretary of the Navy, Washington, D.C.

[21] Appl. No.: 573,699

[22] Filed: May 1, 1975

[51] Int. Cl.² ............................................. G01S 9/56
[52] U.S. Cl. ............................................ 343/6.5 LC
[58] Field of Search ................................. 343/6.5 LC

[56] References Cited

U.S. PATENT DOCUMENTS

| 3,051,928 | 8/1962 | Sullivan | 343/6.5 LC X |
| 3,267,464 | 8/1966 | Shames | 343/6.5 LC X |
| 3,336,591 | 8/1967 | Michnik et al. | 343/6.5 LC |
| 3,573,818 | 4/1971 | Lennon, Jr. | 343/6.5 LC |
| 3,603,993 | 9/1971 | Follen | 343/6.5 LC |
| 3,858,211 | 12/1974 | Litchford | 343/6.5 LC X |

*Primary Examiner*—Malcolm F. Hubler
*Attorney, Agent, or Firm*—R. S. Sciascia; G. J. Rubens; H. Fendelman

[57] ABSTRACT

A battlefield identification friend or foe (BIFF) system comprising a radar unit including a switch for selectively connecting an interrogation encoder to the modulator of a radar unit and a response decoder also located at the radar site. At a remote station is a transponder which includes an interrogation decoder which, when properly interrogated, activates the transponder/transmitter which then transmits a coded response message.

8 Claims, 5 Drawing Figures

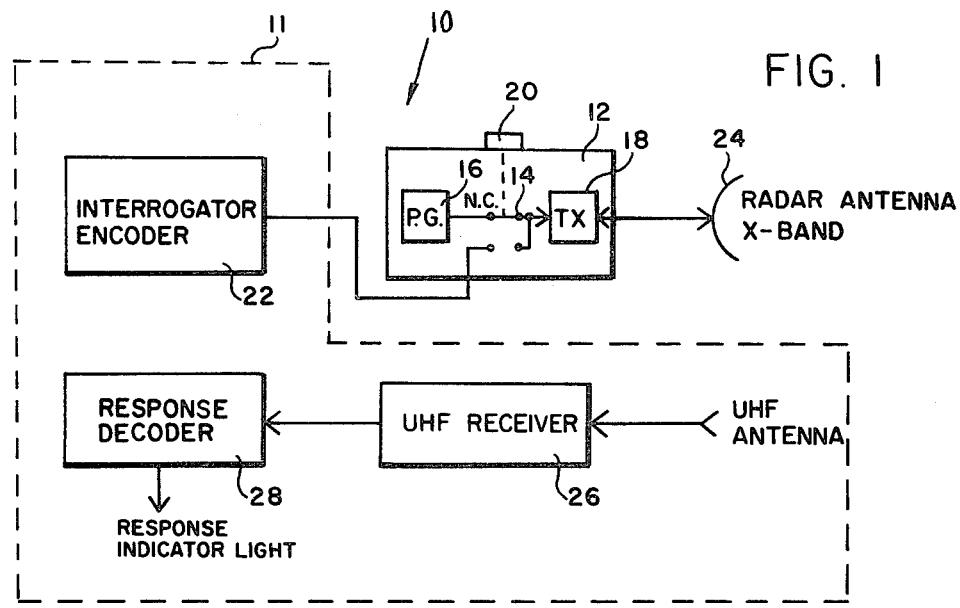
FIG. 1
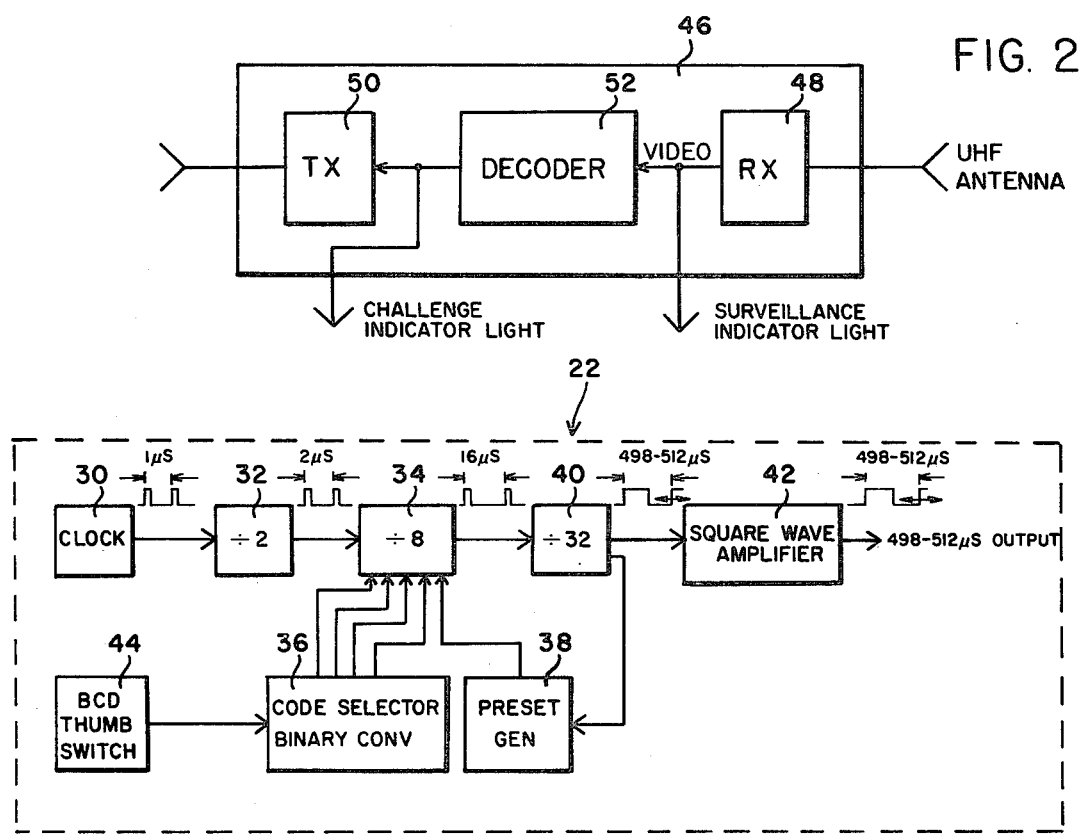
FIG. 2
FIG. 3

BATTLEFIELD IFF SYSTEM

BACKGROUND OF THE INVENTION

Identification, friend or foe, (IFF) has been primarily related in the past to air surveillance radar and related transponder systems; however, it has recently been recognized that there is a need for battlefield identification equipment for ground personnel who could be assigned a squad or a company level. The need for such equipment is made imperative by the problem of discrimination between enemy and friend which is fundamental to every type of conflict including battlefield warfare. The conventional IFF approach used with air surveillance radars is inappropriate for battlefield conditions since that approach requires a complex L-band transmitter and antenna system, is over-sophisticated for the battlefield environment, and would be extremely difficult to reduce in size, weight, and cost to satisfy the man-portable requirements. Electronic and other non-visual techniques for achieving identification have not yet been used operationally by battlefield personnel.

SUMMARY OF THE INVENTION

The present invention relates to a BIFF system in which an interrogator encoder supplies the trigger pulse timing to an existing man-portable field radar which then transmits at one of a set of pulse repetition intervals (PRI's). A remote man-worn transponder then responds only to radar transmissions at the coded PRI length by means of an interrogator decoder located in the transponder. Visual indicators are preferably included with the decoder on the transponder such that indications that the transponder is under surveillance and that the transponder is being interrogated are present. When the transponder decoder senses the proper code initiated at the radar site, the transponder will transmit a response code back to the interrogator unit preferably on a UHF frequency. Both interrogator and responder codes are selectable on a local command level.

Several squads or individual soldiers could carry transponders according to the present invention which could be monitored by various pulse radars. The transponders may respond with the same code or individual codes and, according to the technique of the present invention could provide for individual identification and even for simple messages. Since the present invention utilizes the technique of modulation of the existing radar pulse, it lends itself readily to extremely simple implementation, covert IFF operation, and lowers the probability of electronic counter measures such as jamming or deception techniques.

STATEMENT OF THE OBJECTS OF THE INVENTION

Accordingly, it is the primary object of the present invention to disclose a novel BIFF system.

It is another object of the present invention to disclose generally a novel IFF system.

Other objects, advantages and novel features of the invention will become apparent from the following detailed description of the invention when considered in conjunction with the accompanying drawings.

BRIEF DESCRIPTION OF THE DRAWINGS

FIG. 1 is a block diagram of the radar site of the present invention.

FIG. 2 is a block diagram of the transponder of the present invention.

FIG. 3 is a block diagram of the interrogator encoder of FIG. 1.

DESCRIPTION OF THE PREFERRED EMBODIMENT

Figure 4:
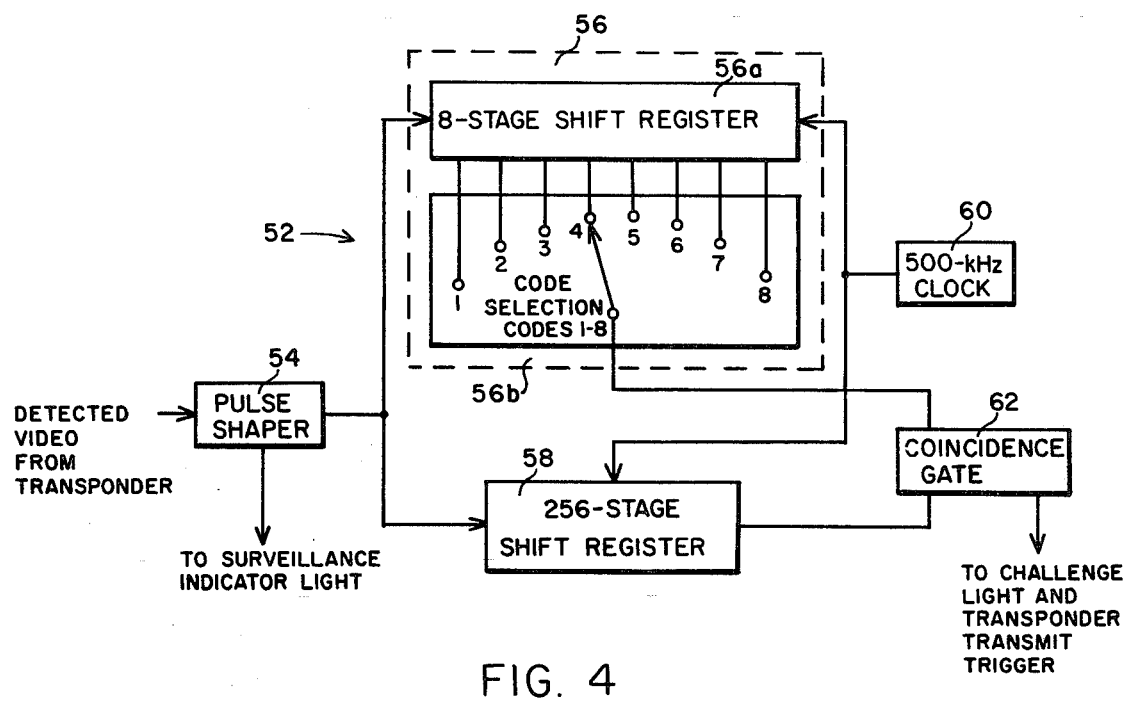
FIG. 4 is a block diagram of the transponder decoder according to the present invention.

The radar site 10 of the present invention is illustrated in FIG. 1 and is comprised of an interrogator section 11 and a modified conventional radar 12. The radar unit 10 operates as a conventional radar but with a pulse repetition interval (PRI) controlled digitally to provide a coded set of PRI's for interrogation of transponders preset to the same code. The radar device 12 which may, for example, be a conventional military AN/PPS-6 portable surveillance radar is modified as described below although it is to be understood that any conventional pulse radar could be used in the present invention. The radar device 12 is modified by the inclusion of normally closed switch 14 which, when in the position illustrated in FIG. 1, normally connects the radar internal timing pulse generator 16 with the radar transmitter 18 which modulates the radar RF with the signal from the generator 16 as is well known. Actuation of switch 14 by external push button 20, which is preferably mounted on the radar unit, disconnects the internal pulse generator 16 from the transmitter 18 and connects the interrogator encoder 22 with the transmitter 18. The radar RF is then modulated by the interrogator encoder 22 signal and transmitted by radar antenna 24. Assuming a friendly remote transponder has received the encoded radar signal, a coded reply signal will be recieved by UHF receiver 26 and decoded by response decoder 28 also located at the radar site 10.

FIG. 3 illustrates a suitable implementation for the interrogator encoder although it is to be understood that any encoder with the capability of varying the pulse repetition rate of the radar RF may be used. It is also to be understood that the existing radar timing pulse generator could be modified to encode the signal. The encoder 22 changes the pulse repetition time only nominally so that the output of the radar still appears like a radar signal and not like an IFF signal. Generally, the encoder 22 varies the radar pulse interval in discrete, variable, well-defined steps. The interrogator encoder 22 developes a precise PRI from a stable clock and preset counter arrangement. One code, corresponding to one PRI, is selected by the operator to interrogate transponders preset to the same code. An example of the coding is illustrated in the table below.

TABLE I

| CODE | PRI(usec) |
|------|-----------|
| 1 | 512 |
| 2 | 510 |
| 3 | 508 |
| 4 | 506 |
| 5 | 504 |
| 6 | 502 |
| 7 | 500 |
| 8 | 498 |

Encoder 22 is comprised of clock 30 which provides the initial pulse train to frequency divider 32. Programmable frequency divider 34 is connected to the output of frequency divider 32 as illustrated and to the outputs of code selector binary converter 36 and preset generator 38. The output of frequency divider 34 is furnished to frequency divider 40 and the output of frequency divider 40 serves as the input to square wave amplifier 42, which supplies the modulating signal input to the radar transmitter 18. Preset generator 38 may comprise, for example, a one-shot multivibrator and code selector binary converter 36 may comprise, for example, the Texas Instruments Model SN54184. Binary coded decimal (BCD) thumbwheel switch 44 serves as the program source. The encoder operates as a programmable counter by dividing the input clock frequency from clock 30 down by programmable steps to a lower frequency. The clock pulse train from 30 is first divided by a factor of 2 by frequency divider 32 and is then divided by frequency divider 34 which is a preset binary counter. 34 functions by dividing by 8 its input or by a factor determined by the program source 44 coincident in time with the reset pulse. Binary coded switch 44 determines what preset lines of the binary counter 34 are to be excited. Code selector binary converter 36 enables the switch logic code to be compatible with the counter 34. Frequency divider 40 again divides the signal frequency. The output signal is then shaped by preset generator 38 and is used as a reset pulse to synchronize the preset code. For a clock of 1 MHz, the output frequency will range, for example, from 1953 to 2008 Hz. In the time domain, this means a pulse repetition time (PRT) of 498 to 512 microseconds programmable in 2 microsecond increment steps which corresponds to the codes 1 through 8 as illustrated in Table I above. The counter output pulse train is then amplified by square wave amplifier 42 and the DC level is shifted to be compatible with the radar modulator in transmitter 18. By means of switch 14 the stable and precise code output pulse train is applied to the radar modulator rather than the existing train from generator 16 when a BIFF interrogation is required. With this method, the normal radar radio frequency emissions can be used also as an IFF interrogation.

In operation, transponder 46 illustrated in block form in FIG. 2 will be located at a remote position from the radar site 10. Referring to FIG. 2, the transponder 46 comprises any conventional transponder such as TRI-DEA Electronics Part No. 1328-76-7 including a receiver section 48 and transmitter section 50. The transponder is modified to incorporate a decoder section 52 connected as illustrated in FIG. 2. Transmission from the transponder 46 is inhibited, therefore, unless a precoded PRI is set into the transponder decoder 52 corresponding to the transmitted PRI. If the proper interrogation code as transmitted by the radar transmitter is being used, the decoder 52 will trigger the transponder transmitter 50 to send back to the radar a coded reply. Thus, the BIFF system of the present invention involves two code transmissions, the interrogator coded signals from the radar to the transponder and a reply coded transmission from the transponder to the radar which is referred to herein as a response code. This response code typically involves either the transmission or non-transmission of a predetermined number of pulses with a predetermined spacing between each of the pulses. The number of pulses and the spacings therebetween thereby establish the coding of the response as is well known.

Referring now to the FIG. 4, block diagram of the decoder 52 which is essentially a pulse position comparator, it is seen that the detected video from the transponder receiver 48 is inputted to pulse shaper 54 which sharpens the video pulses and amplifies them as required. The pulse shaper 54 output is split into two paths, one signal being applied to selectable tap programmable length shift register 56 which may comprise, for example, an 8-stage shift register 56a and a selector switch 56b by which the length is programmed. The other signal is applied to a second shift register 58 which is a 256-stage shift register in the present example. These two shift registers are clocked by the same clock 60 and then applied to a time coincidence AND gate 62. The effect of the two shift registers 56 and 58 is to provide a time delay of different times. By selecting the same number on the decoder 52 as on the interrogator 11, the two signal paths come together at the AND gate with time coincidence. Proper timing of the AND gate inputs causes the output of the gate 62 to trigger the transponder to reply and may also trigger a challenge indicator light to provide an indication of the condition. As an example of the timing, assume that code 2, a PRT of 510 microseconds is used to interrogate the transponder. The 8-stage shift register will delay the pulse train by 2 microseconds and the 256-stage shift register will delay the pulse train by 512 microseconds thus causing time coincidence and activation of the transponder transmitter 50.

Figure 5:
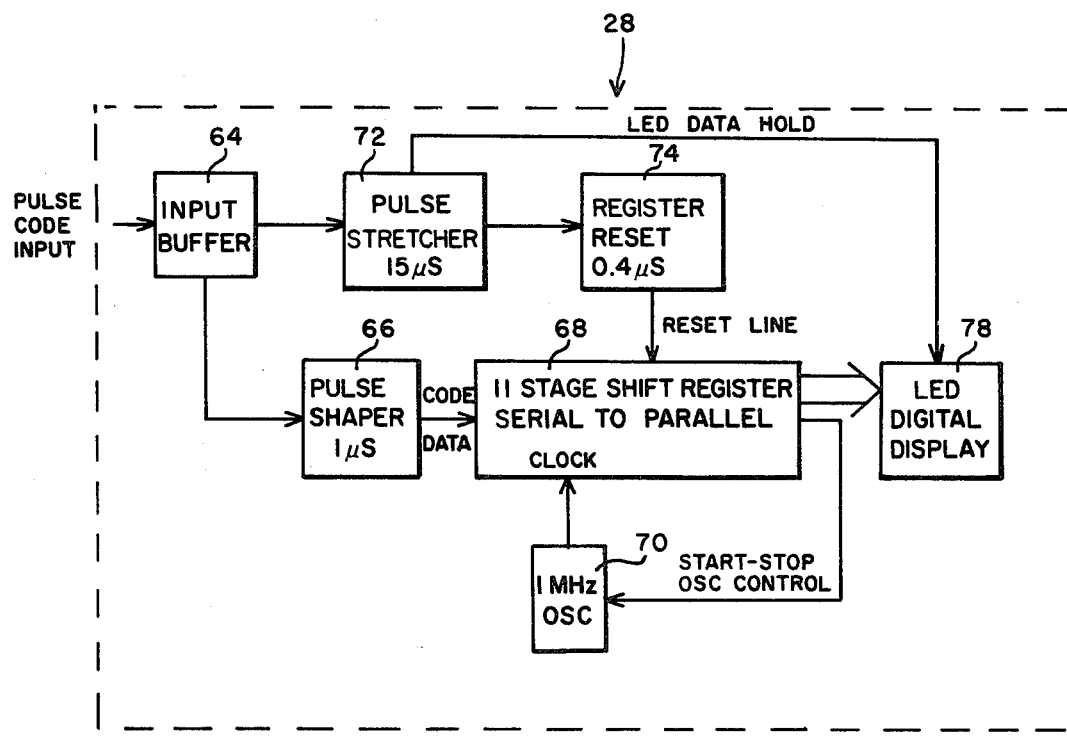
FIG. 5 is a block diagram of the response code decoder according to the present invention.

A conventional UHF receiver 26 may be attached to the radar 12 located at the radar site 10 to receive the UHF replies from the transponder. The UHF receiver 26 receives the pulse-code modulation response code signal from the transponder and produces a pulse output compatible with a digital shift register, according to the illustrated embodiment, although it is to be understood that any suitable type of response coding and decoding technique could be utilized. The response code pulse decoder 28 may comprise a tapped shift register arrangement, allowing the code to be shifted in and then gated off and stored for most of the interpulse period. The stored code is tapped to an LED matrix display which remains on only when the system is in the interrogate mode according to the embodiment illustrated in FIG. 5. In operation, the radar operator is interested in seeing the proper coded reply when he interrogates a detected target. The received reply is detected and set to the response code decoder 28 which will display the code numbers sent by the transponder. The coded pulse train input is applied to input buffer 64 and pulse shaper 66 which shapes the pulse and then applies it to shift register 68 where it is temporarily stored. The incoming data will turn on and off the internal clock 70. Pulse stretcher 72 and register reset generator 74 both may be comprised of a one shot multivibrator such as Texas Instruments SN54121. 72 will hold the response code during the entire PRI, and 74 will reset register 68, just prior to the next incoming response code. Parallel taps of the shift registers 68 are applied to the LED digital display 78, whereby the transmitter reply response code is displayed to the operator.

Obviously many modifications and variations of the present invention are possible in the light of the above teachings. It is therefore to be understood that within the scope of the appended claims the invention may be practiced otherwise than as specifically described.

What is claimed is:
1. An identification system comprising:
 a surveillance radar device including an internal modulating timing pulse generator and a radar carrier frequency transmitter for outputting a modulated radar carrier frequency signal;

an interrogator encoder means for coding said radar signal;

switch means for selectively connecting said interrogator encoder means to said radar transmitter and for disconnecting said internal modulating timing pulse generator from said radar carrier frequency transmitter whereby actuation of said switch means results in a coded radar signal;

a transponder for transmitting a response signal in response to said predetermined coded radar signal; and a response signal receiver means for detecting the transmission of sid response signal.

2. The system of claim 1 wherein said interrogator encoder means includes modulating signal generator means for manually, adjustably varying the pulse repetition interval of the output of said radar transmitter.

3. The system of claim 2 wherein said interrogator encoder comprises:

a pulse train generator;

a programmable binary counter connected to said pulse train generator; and a program source connected to said programmable binary counter.

4. The system of claim 2 wherein said transponder includes:

a transponder receiver;

a decoder connected to said receiver; and a transmitter connected to said decoder;

whereby in response to said predetermined coded radar signal said transponder transmitter transmits said response signal.

5. The system of claim 4 wherein said transponder transmits one of a plurality of coded response signals; and said response signal receiver means comprises response code decoder means for identifying which one of said plurality of coded response signals was transmitted.

6. The system of claim 2 wherein said transponder decoder comprises:

first and second time delay means; and an AND gate having first and second inputs connected to said first and second time delay means, respectively.

7. The system of claim 6 wherein said first time delay means comprises:

a shift register having a plurality of stages and being operably coupled to a code selector switch means for selecting the time delay introduced by said shift register.

8. An interrogator comprising:

a surveillance radar device including an internal modulating timing pulse generator and a radar carrier frequency transmitter for outputting a modulated radar signal;

an interrogator encoder means for coding said radar signal;

switch means for selectively connecting said interrogator encoder means to said radar carrier frequency transmitter and for disconnecting said internal modulating timing pulse generator from said carrier frequency transmitter whereby actuation of said switch means results in a coded radar signal.

* * * * *